United States Patent
Wood et al.

(10) Patent No.: US 6,801,751 B1
(45) Date of Patent: Oct. 5, 2004

(54) INTERACTIVE LEARNING APPLIANCE

(75) Inventors: Michael C. Wood, Orinda, CA (US);
James Marggraff, Lafayette, CA (US);
Matthew Brown, Berkeley, CA (US);
Matt Fishbach, Piedmont, CA (US)

(73) Assignee: Leapfrog Enterprises, Inc., Emeryville, CA (US)

( * ) Notice: Subject to any disclaimer, the term of this patent is extended or adjusted under 35 U.S.C. 154(b) by 156 days.

(21) Appl. No.: 09/632,424

(22) Filed: Aug. 4, 2000

Related U.S. Application Data

(60) Provisional application No. 60/181,967, filed on Feb. 10, 2000, and provisional application No. 60/168,214, filed on Nov. 30, 1999.

(51) Int. Cl.[7] .................................................. B09B 7/00
(52) U.S. Cl. ........................ 434/362; 434/350; 434/322
(58) Field of Search ................................ 434/350, 362, 434/322, 323, 307 R, 169, 167, 327, 320, 351, 393, 298; 369/63; 463/42, 43; 446/297, 301, 175

(56) References Cited

U.S. PATENT DOCUMENTS

| | | | |
|---|---|---|---|
| 2,826,828 A | | 3/1958 | Hamilton |
| 2,921,385 A | | 1/1960 | Hamilton |
| 3,052,041 A | | 9/1962 | Luxton et al. |
| 3,371,321 A | | 2/1968 | Adams |
| 3,660,913 A | * | 5/1972 | Heath ............... 434/189 X |
| 4,679,789 A | | 7/1987 | Okada |
| 4,690,645 A | | 9/1987 | Ukisu |
| 5,002,491 A | * | 3/1991 | Abrahamson et al. ...... 434/322 |
| 5,018,082 A | | 5/1991 | Obata et al. |
| 5,122,952 A | | 6/1992 | Minkus |
| 5,204,968 A | | 4/1993 | Parthasarathi |
| 5,261,823 A | | 11/1993 | Kurokawa |
| 5,267,865 A | | 12/1993 | Lee et al. |
| 5,302,132 A | | 4/1994 | Corder |
| 5,307,263 A | * | 4/1994 | Brown ....................... 600/301 |
| RE34,728 E | | 9/1994 | Hall-Tipping |
| 5,377,100 A | | 12/1994 | Pope et al. |
| 5,387,104 A | | 2/1995 | Corder |
| 5,413,355 A | | 5/1995 | Gonzalez |
| 5,513,308 A | | 4/1996 | Mori |
| 5,535,321 A | | 7/1996 | Massaro et al. |
| 5,562,453 A | | 10/1996 | Wen |
| 5,597,312 A | | 1/1997 | Bloom et al. |
| 5,681,170 A | | 10/1997 | Rieber et al. |
| 5,683,082 A | | 11/1997 | Takemoto et al. |
| 5,685,776 A | * | 11/1997 | Stambolic et al. ........ 463/46 X |
| 5,727,950 A | | 3/1998 | Cook et al. |
| 5,727,951 A | | 3/1998 | Ho et al. |
| 5,746,602 A | * | 5/1998 | Kikinis ................... 434/169 X |
| 5,774,118 A | | 6/1998 | Hatakama |

(List continued on next page.)

FOREIGN PATENT DOCUMENTS

| | | | | | |
|---|---|---|---|---|---|
| JP | S59-44078 | * | 9/1982 | ............ | G09B/7/02 |
| JP | 59-44078 A | | 3/1984 | | |
| JP | S61-252575 | * | 5/1985 | ............ | G09B/7/02 |
| JP | 61-252575 A | | 11/1986 | | |

OTHER PUBLICATIONS

PenMaster Handwriting Recognition System, 2 pgs.

*Primary Examiner*—S. Thomas Hughes
*Assistant Examiner*—Chanda L. Harris
(74) *Attorney, Agent, or Firm*—Townsend and Townsend and Crew LLP

(57) ABSTRACT

A method for assisting a user in learning is provided. The method may comprise receiving performance information of a user after the user uses an interactive learning appliance. The user performance information is generated by the user's use of the interactive learning appliance which is adapted to educate the user about one or more predetermined subjects. The performance information, which may be in the form of a user log file, may be received at a server computer from a site where the user is present.

31 Claims, 10 Drawing Sheets

U.S. PATENT DOCUMENTS

| | | | |
|---|---|---|---|
| 5,779,486 A | | 7/1998 | Ho et al. |
| 5,788,508 A | * | 8/1998 | Lee et al. .................... 434/350 |
| 5,820,386 A | | 10/1998 | Sheppard, II |
| 5,823,781 A | * | 10/1998 | Hitchcock et al. ...... 434/118 X |
| RE36,028 E | | 1/1999 | Deesen et al. |
| 5,855,483 A | * | 1/1999 | Collins et al. .......... 434/322 X |
| 5,863,208 A | * | 1/1999 | Ho et al. .................... 434/362 |
| 5,879,163 A | * | 3/1999 | Brown et al. ........... 434/236 X |
| 5,902,116 A | | 5/1999 | Rieber et al. |
| 5,904,485 A | | 5/1999 | Siefert |
| 5,944,533 A | * | 8/1999 | Wood ..................... 434/322 X |
| 5,957,699 A | * | 9/1999 | Peterson et al. ........ 434/350 X |
| 5,967,793 A | | 10/1999 | Ho et al. |
| 5,971,850 A | | 10/1999 | Liverance |
| 5,971,855 A | * | 10/1999 | Ng ........................... 463/42 X |
| 6,012,961 A | | 1/2000 | Sharpe, III et al. |
| 6,036,496 A | * | 3/2000 | Miller et al. ............. 434/156 X |
| 6,039,575 A | * | 3/2000 | L'Allier et al. ......... 434/323 X |
| 6,064,856 A | | 5/2000 | Lee et al. |
| 6,142,784 A | | 11/2000 | Wood |
| 6,149,441 A | | 11/2000 | Pellegrino et al. |
| 6,164,975 A | | 12/2000 | Weingarden et al. |
| 6,190,178 B1 | * | 2/2001 | Oh ......................... 434/323 X |
| 6,211,451 B1 | * | 4/2001 | Tohgi et al. ........... 84/470 R X |
| 6,290,504 B1 | * | 9/2001 | Benitz et al. ........... 434/185 X |
| 6,290,566 B1 | * | 9/2001 | Gabai et al. ............. 446/175 X |
| 6,299,452 B1 | * | 10/2001 | Wasowicz et al. ...... 434/178 X |
| 6,301,462 B1 | * | 10/2001 | Freeman et al. ........ 434/350 X |
| 6,328,569 B1 | * | 12/2001 | Jenkins et al. .......... 434/169 X |
| 6,330,426 B2 | * | 12/2001 | Brown et al. ........... 434/307 R |
| 6,427,063 B1 | * | 7/2002 | Cook et al. ................. 434/350 |
| 6,463,257 B1 | * | 10/2002 | Wood ......................... 434/308 |

\* cited by examiner

| ID | Task Name | 1 | 2 | 3 | 4 |
|----|-----------|---|---|---|---|
| 12 | Addition | | | Addition | |
| 13 | Sums to 12 | | | | |
| 14 | Subtraction | | | | Subtract |
| 15 | Facts to 12 | | | | |
| 16 | Problem Solving | | | | Problem |
| 17 | Solve one step oral | | | | |
| 18 | Solve one-step using pennies, nickels, dimes | | | | |
| 19 | Money | Money | | | |
| 20 | Identify value of penny, nickel, dime | | | | |
| 21 | Exchange penny, nickel, dime for equivalents | | | | |
| 22 | Time | Time | | | |
| 23 | Name number of hours in a day, days in a week, months in a year | | | | |
| 24 | Read time to the hour | | | | |

| Level One - Mastery | | | | | Key: T & S Base Content | Key: T & S Downloaded Content |
|---|---|---|---|---|---|---|
| Skill Area | | | | | | |
| | Tools | | | | | |
| | | Skill | | Example | Common Error | Error Example |
| | Numbers | | | | | |
| | | Numerals | | | | |
| | | | Identify numerals 1 to 12 | Dial 7? | Faulty numeral recognition | Dial 7 - answer 4 |
| | | | Identify numerals to 100 in random order | "Dial 37?" | Faulty numeral recognition | "Dial 44" - answer 55 |
| | | Number Sense | | | | |
| | | | Identify missing number in a sequence | 4, _, 6, 7 | Counting error | Answer > 4, 9, 6, 7 |
| | | Place Value | | | | |
| | | | Identify number in 10's and 1's place | How many 10's | Faulty place recognition | How many 10's  > 58 Answer: 8 |
| | | | Indicate less than or greater than (without using signs) when given two numberals less than 50 | Which is bigger - 15, 18? | Number line error | Bigger - 18. Doesn't visualize position on number line. |
| | | Symbols | | | | |
| | | | Recognize the following symbol: +, -, x, -, = | Dial the sign for adding.... | Faulty symbol recognition | "Dial the sign for adding"? Answer = "-" |
| Computation | | | | | | |
| | Addition | | | | | |
| | | | Compute with addition facts, sums to 12 | 6 + 3 = ? | Fact error | 4 + 2 = 7 |
| | Subtraction | | | | | |
| | | | Compute with subtraction facts to 12 | 7 - 2 = ? | Fact error | 7 - 2 = 9 |

| Level Two - Mastery | | | | | | Key:<br>T & S Base Content | Key:<br>T & S Downloaded Content |
|---|---|---|---|---|---|---|---|
| | Skill Area | | | | | | |
| | | Tools | | | Skill | Example | Common Error | Error Example |
| | | Numbers | | | | | | |
| | | | Number Sense | | | | | |
| | | | | | Identify numerals to 999 | "Dial 372?" | Faulty numeral recognition | "Dial 372" - answer 472 |
| | | | | | Identify the missing element in a numerical sequence of two or three digit numbers | Fill in the blank > 99, 100, ___, 102 | Counting error | Any incorrect response |
| | | | | | Skip count by 5's to 100, 2's to 50, 10's to 100 | Display - 20 Audio: "Count by 10's. What comes next?" Dial 30 and slam | Counting error | Any incorrect response |
| | | | Place Value | | | | | |
| | | | | | Identify place value of digit through 100's | What number in 10's place > 891? | Faulty place recognition | How many 100's > 891 Answer: 9 |
| | | | Symbols | | | | | |
| | | | | | Recognize the multiplication symbol (x) | Dial the sign for multiplying | Faulty symbol recognition | Any incorrect response |
| | | Computation | | | | | | |
| | | | Addition | | | | | |
| | | | | | Compute with addition facts sums to 18 | 9 + 9 = ? | Fact error | 4 + 2 = 7 |
| | | | | | Compute sum with 2-digit numbers (no regrouping) | 25 + 31 = ? | Error in column position | 23 + 31 = 34 |
| | | | | | Compute sum of 2-digit numbers with regrouping | 49 + 15 = ? | Forget to add carrier number | 27 + 39 = 56 |

INTERACTIVE LEARNING APPLIANCE

CROSS REFERENCE TO RELATED APPLICATIONS

This application claims the benefit of the U.S. Provisional Patent Application No. 60/181,967 filed Feb. 10, 2000 and Ser. No. 60/168,214 filed Nov. 30, 1999 which are herein incorporated by reference in their entirety for all purposes.

FIELD OF THE INVENTION

Embodiments of the invention relate to appliances, systems, and methods for providing a user with an interactive learning experience.

BACKGROUND OF THE INVENTION

A number of electronic learning devices exist to help a user learn about a particular subject. In one conventional electronic learning device, the device randomly requests a response from the user, such as how to spell a particular word. The user then inputs a response into an input device, such as a keyboard. The device then tells the user if the response is correct.

A problem with this type of device is that the device typically includes subject matter having only a single level of intellectual difficulty. While a device having a single level of intellectual difficulty may be effective in maintaining the attention span of a child possessing a corresponding level of intelligence, it has been found that this type of device is not as effective in maintaining the attention span of children having higher or lower levels of intelligence. For example, a child with a lower level of intelligence than the intellectual level provided by a learning device of this type would become easily frustrated by the difficulty of the questions provided by the device. Likewise, a child having a higher level of intelligence than the intellectual level provided by the device would become bored with the device because the questions are too easy.

Some have attempted to solve this problem by providing an electronic learning device which, after receiving responses from the user, automatically adjusts the level of difficulty to the user's level of intelligence. The device operates to lower the level of difficulty of the requests when the user responds inappropriately, and further operates to increase the level of difficulty when the user responds appropriately. The device maintains a level of difficulty, and then raises or lowers the level of difficulty to further maintain the attention of the user.

While an electronic learning device such as this one is effective in some instances. a number of improvements could be made. For example, the educational content included in the learning devices mentioned above is limited. Even if an electronic learning device is capable of adjusting its level of difficulty to the user's level of intelligence, the user will have interacted with all of the educational content in the electronic learning device at some point. The user may learn the correct answers to a specific set of questions without having mastered the general principles representative of a level of learning. After the user has interacted with all of the available content, the user will become bored and will no longer be interested in using the device. The user will then have to purchase another learning device with different electronic content. Even if another learning device is available, this option is costly to the user. Moreover, the user can easily become disinterested in the learning device if the electronic content is not specifically suited for the user's needs or preferences. For example, if a learning device is intended to teach math to a user by providing problems relating to cooking (e.g., if 6 teaspoons of sugar are added to a cake mixture, how many tablespoons of sugar are added to the cake mixture?), those users who are not interested in cooking-related math problems may not be interested in using the device. In another example, a user may have mastered multiplication, addition, and subtraction, but may have had trouble mastering division. The educational benefit derived by the user may be limited if the device provides an equal number of problems in each of these subject areas. In other words, if the device provides too many problems in those subjects where the user is proficient and not enough problems in those subjects where the user is deficient, the educational benefit obtained by the user may not be adequate to help the user quickly overcome his learning deficiencies (e.g., in division). Furthermore, when the users are children, adults such as parents and teachers cannot monitor the child's progress when the child uses conventional learning devices. Information regarding the child's interaction with the device is not stored. Consequently, adults may be unaware of the child's learning difficulties and the child may not receive the needed guidance from adults to assist the child in learning. Accordingly, an improved learning device would be desirable.

Embodiments of the invention address these and other problems.

SUMMARY OF THE INVENTION

In embodiments of the invention, an interactive learning appliance (ILA) adapts to the user's level of intelligence and other characteristics of the user. The electronic content used in the learning appliance may be specifically targeted to the preferences or characteristics of the user, and may change as the user uses the appliance over time. Consequently, the interactive learning appliance can be specifically adapted for a particular user and can "grow" with the user.

One embodiment of the invention is directed to a method comprising: (a) receiving performance information of a user, wherein the user performance information is generated by the user's use of an interactive learning appliance which is adapted to educate the user about a predetermined subject; (b) creating a content package using the user performance information, wherein the content package is adapted to modify the interactive learning appliance; and (c) sending the content package to the user.

Another embodiment of the invention is directed to a system comprising: a server computer adapted to (a) receive performance information of a user, wherein the user performance information is generated by the user's use of an interactive learning appliance which is adapted to educate the user about a predetermined subject, (b) create a content package using the user performance information, wherein the content package is adapted to modify the interactive learning appliance; and (c) send the content package to the user; and an electronic content database in communication with the server computer, wherein the electronic content includes information used to create the content package.

Another embodiment of the invention is directed to an interactive learning appliance for assisting a user in learning. The interactive learning appliance comprises: a processor; an input device; an output device; and an information storage medium comprising a user log file, wherein the user log file receives information relating to the user's use of the interactive learning appliance, and wherein the user log file is adapted to be sent to a server computer which creates a content package to be used in the interactive learning appliance, after receiving the user log file.

Another embodiment is directed to a system for assisting a user in learning. The system may comprise a) a server computer; b) an interactive learning appliance including an information storage medium comprising performance information of the user and a content package including content suitable for the users level of skill based on the performance information; c) an electronic content database in communication with the server computer, wherein the electronic content database includes content used to create the content package; and d) a linker device adapted to transfer the content package to the information storage medium.

Another embodiment of the invention is directed to a method for assisting a user in learning. The method comprises: (a) receiving performance information of a user, wherein the user performance information is generated by the user's use of an interactive learning appliance; (b) creating a content package using the user performance information, wherein the content package is adapted to modify the interactive learning appliance and includes content which is selected from multiple zones of varying skill; and (c) sending the content package to the user.

These and other embodiments are discussed in further detail below.

BRIEF DESCRIPTION OF THE FIGURES

FIGS. 5(a) to 5(b) show matrices illustrating the relationship between specific types of problems and zones for a math-based interactive learning appliance.

FIGS. 6(a) to 6(b) show tables illustrating particular types of common errors associated with certain skills.

DETAILED DESCRIPTION

Figure 1:
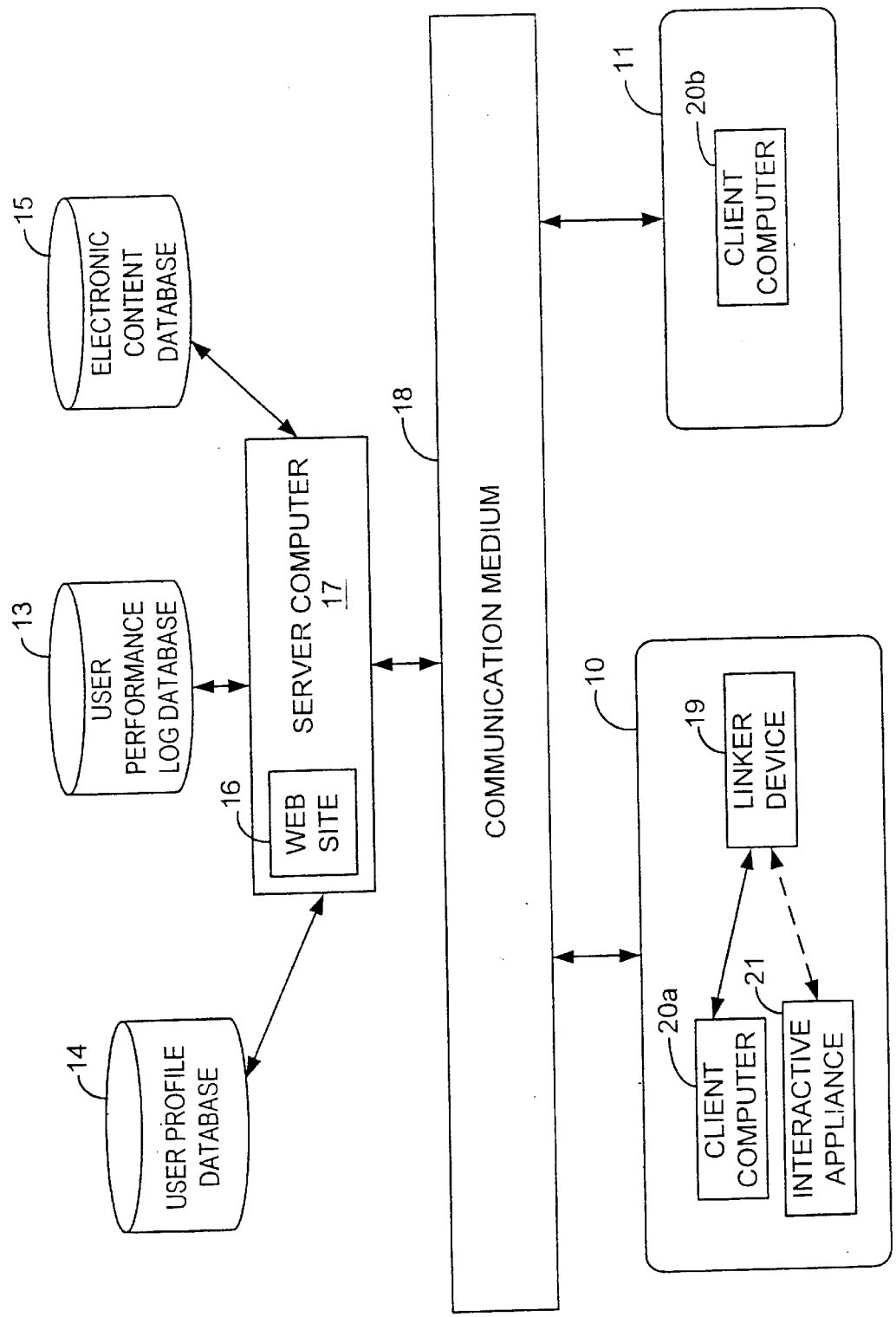
FIG. 1 shows a block diagram of a system according to an embodiment of the invention.

In embodiments of the invention, a method for assisting a user in learning is provided. The user may be a child, or even an adult (e.g., a student). Preferably, the user has an age between about 2 and 17 years old.

The method may comprise receiving performance information of a user after the user uses an interactive learning appliance adapted to educate the user about one or more predetermined subjects. Subjects which can be learned using embodiments of the invention are not limited and may include colors, number recognition, pronunciation, current events, songs, general math, algebra, subtraction, multiplication, division, fractions, decimals, geometry, science, geography, history, spelling, grammar, the names and sounds of musical instruments, people, places, nature, music, multi-part harmonies sports, letters, numbers, counting, social studies, etc.

The user performance information is generated by the user's use of the interactive learning appliance. Performance information is written to a user log file which is sent from a site where the user is present to a server computer. After the server computer receives the user log file, the server computer can create a content package using the user performance information and the user's personal profile. The created content package is then sent to the user preferably via the Internet Once received, the user loads the content package into the interactive learning appliance to modify the operation of the appliance. The modified learning appliance then presents the contents of the content package (e.g., problems, facts, instruction, music, messages, etc.) to the user for consumption. Since the content for the content package is determined using the user's profile and/or previous performance information, the modified interactive learning appliance is specifically adapted to educate the user.

Over time, many log files can be uploaded to the server computer and many content packages can be downloaded and used in the interactive learning appliance. The characteristics of the content packages change as the user's intelligence and/or preferences change over time. When the content packages are used in the interactive learning appliance, the interactive learning appliance can also change and adapt over time so that the user experiences adaptive learning. Where the user is a child, for instance, adaptive learning occurs through a series of interactions between the child and the interactive learning appliance. As the child interacts with the interactive learning appliance over time, the interactive learning appliance builds a small user log documenting the child's current state of learning using certain performance information obtained from the interactive learning appliance. Using this performance information, the child is then placed in a "zone" for each skill tested.

Zone analysis and placement can occur at any suitable location. For example, zone analysis and placement can occur at the server computer at the user's site (e.g., within the interactive learning appliance or at a client computer) or at both the user's site and the server computer. It is understood that any of the described zone analysis and placement methods described below can occur at the server computer, client computer, and/or interactive learning appliance. In preferred embodiments, zone placement and analysis occurs at both the server computer and the interactive learning appliance. In these embodiments the interactive learning appliance may contain a less complex or different version of the zone placement and analysis software used on the server computer. In addition, zone placement and analysis software residing in the interactive learning appliance preferably determines the user's zone much more quickly (but potentially less accurately) than the zoning software on the server computer. These embodiments are especially useful for a user who initially uses an interactive learning appliance and does not have a history of interaction with the learning appliance. The user's zone can be determined very quickly, and the user will be challenged with problems which are suitable for his intelligence level or knowledge level in a very short period of time. Consequently, the user will not become disinterested with the interactive learning appliance even if the user has only used the interactive learning appliance for a brief period of time.

A typical interactive learning appliance can test many skills. For example, the learning appliance can test skills such as addition, subtraction, division, and multiplication. The zones for a particular skill may be differentiated according to intellectual ability. Each skill tested may comprise multiple zones, and each zone may include a number of problems with a predetermined level of difficulty. For example, the problems in zone 1 may be easier than the problems in zone 2. A user may have a greater proficiency in one skill than another skill, and the user may be placed in different zones for different skills. For example, the user may be proficient in spelling, but may not be proficient in grammar and may be placed in zones 5 and 3 for these skills, respectively. In another example, the user may quickly learn one spelling rule, for example the i-before-e rule, but have continuing trouble with a different spelling rule in the same zone, for example, the use of double consonants. As a result, the user may be presented with "i-e" problems from a higher zone than the zone from which double consonant problems are selected. Each skill may have any suitable number of zones. For instance, a skill such as adding may have 5, or even 10 or more different zones, where each successive zone has increasingly difficult sets of addition problems.

As the user uses the interactive learning appliance, performance information is generated. Performance information may relate to the particular responses provided by the user. Examples of performance information include the user's response latency, the frequency of correct and/or incorrect responses provided by the user, the correctness or incorrectness of the most recent responses provided by the user, the problem IDs (a problem ID is an identifier such as a numeric code for a particular problem) of the problems attempted by the user, and the types of problems attempted by the user.

In preferred embodiments, the user performance information includes information relating to errors made in the learning process. Error information can be used to create a content package. In a typical example, the user's errors from a previous interactive session (e.g., the time between two successive uploads of user log files) are analyzed before selecting problems for the content package. For example, after a user log file is received, the user's log file can be parsed to determine the percentage of correct and incorrect answers based on the total number of problems attempted. Each problem is marked in the user's log in a user performance log database as "used" (correct answer) or "tried" (incorrect answer). If an answer to a problem is incorrect, a counter for the error type associated with the problem is incremented.

A server computer may use the performance information (e.g., error information) in a raw, unanalyzed, or manipulated form to create a content package with a prescriptive component for the user. For example, when creating a content package, each interaction between a child and the interactive learning appliance can be analyzed. An interaction may be, for example, a problem presentation and an answer from a user. The user's answers are analyzed and the most common errors are determined. A personal adaptive learning module (PALM) on a server computer can select appropriate problems to include in the content package, given the user's current zone and the user s common error information. For example, while parsing through the user log file, variables representing the frequency of various error types will be incremented whenever an incorrect answer is identified. The most frequent error types can be identified and this information may be used by a PALM to select problems for the content package. After they are selected, an ACP (automatic content packager) carefully organizes and sequences the problems in a content package for presentation to the user. Depending on the available memory or other constraints, the number of error types may be more or less than three.

At the same or different time, an update module reviews the state of the user's zone based on the user's recent responses and may update the zone if certain criteria are met. The criteria may be that the user answer enough problems correctly before advancing to the next zone or answer enough problems incorrectly before the child is put in a lower zone. In some embodiments, the number of problems which the user answers incorrect or correctly before moving to a lower or higher zone may be statistically significant. For example, the zone can be incremented if a child has answered at least 50% of the problems correctly and has attempted at least 5 problems within the zone. If less than 5 problems in the current zone have been attempted, the current zone is maintained. If the percentage of correct responses falls below 50% and more than 5 problems have been attempted, the zone can be decremented. In another example, the zone can be incremented if a child has answered at least 80% of the problems correctly and has attempted at least 20 problems within the zone. If less than 20 problems in the current zone have been attempted, the current zone is maintained. If the percentage of correct responses falls below 80% and more than 20 problems have been attempted, the zone can be decremented.

Computer programs residing on the server computer can analyze the data in the uploaded user log file, produce reports for the child, parents, and teachers, and make determinations about what additional content should be downloaded to the user's interactive learning appliance to continue the learning process. The reports may be viewed on a Web site or may be downloaded to the user's site for viewing, and may include graphs, tables, charts, or symbols (e.g., letter grades) representing the user's performance. The uploaded user log file may provide any information needed for reporting. For instance, the user's age and grade level may be in the user log file and can be used to prepare a report showing the user's performance as compared to others of like grade level or age. After the reports are viewed by other persons such as parents and teachers, they can upload their own content to the server computer and/or select content provided by the host entity on the host entity's Web site. The uploaded or selected content can be included in a subsequently created content package for the user, with or a without content which is automatically selected by the server computer.

One or more competency matrices can be,used to create content for each particular type of interactive learning appliance. The competency matrices organize and sequence the skills into appropriate levels to insure that problems are presented in the proper order of complexity. In embodiments of the invention, the competency matrices for each type of interactive learning appliance can form the "shell" within which the contents for the content packages are developed.

As noted above, any suitable subject (sometimes referred to as a knowledge domain) can be learned. The subject to be learned may be divided and subdivided in any suitable manner in the competency matrices. For example, the divisions or subdivisions of a subject may be labeled "skill areas", "topics", "skills", or "categories". In an exemplary embodiment, a math competency matrix may be organized into a number of skill areas. Exemplary skill areas in the math competency matrix may include "numbers" and "computation". The skill areas may be divided into topics such as "numerals", "number sense", "place value", "symbols", "addition", "subtraction","multiplication", and "division". Each topic may be further divided into specific skills. An example of a specific skill under the topic "numerals" might be "identify numerals 1 to 12".

The competency matrices may be based on or correlated with standards advocated by leading organizations such as the National Council for Teachers or Mathematics, the National Council of Teachers of English, the National Council of Teachers of Social Studies or the Association for Supervision and Curriculum Development. After consulting published research and after interviewing experienced teachers, common errors made by students while learning these skills have been identified. These error types can be used in the adaptive assessment and content selection procedures and can provide a basis for reporting about the child's learning progress. Pedagogical strategies and principles are used to control both the individual interactions (the micro level strategies) as well as the tracking and planning necessary to move from one learning level to another (macro level strategies).

FIG. 1 shows a system according to an embodiment of the invention. The system includes a location 10 where the user is present (i.e., a user site). At this location 10, a client computer 20(a) such as a personal computer can be operatively coupled to a linker device 19. The linker device 19 may be coupled to the client computer 20(a) through a wireless or a wired link (e.g., a cable). An interactive appliance 21 may be included in the system and may communicate with the client computer 20(a) via the linker device 19. In this example, the client computer 20(a) is shown as being separate and distinct from the interactive learning appliance 21. However, the client computer 20(a) could also be disposed within the interactive learning appliance 21 so that an intervening computer unit is not needed at the user's site to communicate with a remotely located server computer 17.

The linker device 19 may be any suitable device capable of transferring data between the client computer 20(a) and the interactive learning appliance 21. The linker device 19 could be, for example, a wireless transceiver such as a wireless RF (radio frequency) transceiver or an infrared transceiver. In preferred embodiments, however, the linker device 19 is a device which is capable of reading information from, and writing information to, the transferable information storage medium. In a typical embodiment, the transferable information storage medium may be a cartridge which can be inserted into both the linker device 19 and the interactive appliance 21. Preferably, the transferable information storage medium can be inserted within many different types of interactive learning appliances. For example, the transferable information storage medium may be inserted into a cylindrically shaped interactive learning appliance or into an interactive learning appliance in the form of a child's laptop computer. A user may thus own many different types of interactive learning appliances, while using one linker device and one transferable information storage medium.

The transferable information storage medium may be in any suitable form. For instance, the transferable information storage medium may be a cartridge, a disk, a tape, or a memory stick. Cartridges are especially desirable since they can be easily manipulated and handled by children. Any suitable amount of storage space may be provided on the transferable information storage medium. Preferably, the capacity of the information storage medium is at least about 512 K.

A server computer 17 including data representing a Web site 16 can be in operative communication with the client computer 20(a) at the user's site 10. The Web pages of the Web site 16 may include any number of interactive features including any suitable number of hyperlinks to help guide the user through the Web site 16. The Web site 16 may also have a number of graphical user interfaces for the user to input information such as his name, grade, preferences, etc. into the system. A browser on the client computers 20(a), 20(b) in communication with the server computer 17 permits the user or others to view the Web site 16 and pages thereof. Examples of suitable browsers include Internet Explorer™ which is commercially available from Microsoft and Netscape Navigator™. Access to the Web site 16, and in particular to the user's information (e.g., profile information), may be restricted by requiring that any visitors enter an identifier (e.g., a password) to show that the persons accessing the information have proper authorization.

The user or other persons may contact the Web site 16 to obtain information or upload information. In some embodiments, the server computer 17 can generate reports for particular users. These reports can be viewed on the Web site 16 by parents, teachers, or others using the client computers 20(a), 20(b). Parents, teachers, or others can request that the reports be sent through some other mode of delivery (e.g e-mail or regular mail). At the Web site 16, they can also select content provided by a host entity or may choose or upload their own content to be included in a content package for particular user's of the interactive learning appliance 21. The selected or uploaded content may be used with or without a prescriptive component, and with or without automatically selected content in the content package. Advantageously, embodiments of the invention provide users with a great deal of flexibility. The user, other persons, or the server computer may modify or create a content package for the user's interactive learning appliance so that it is tailored for the user.

The server computer 17 is typically a powerful computer or cluster of computers. For example, the server computer 17 can be a large mainframe, a minicomputer cluster, or a group of servers functioning as a unit. In one example, the server computer may be a database server coupled to a Web server. Moreover, the server computer 17 can behave as a single computer which services the requests of one or more client computers. Client computers, such as the client computers 20(a), 20(b) shown in FIG.1 can communicate with the server computer 17 through the Internet and optionally through one or more Internet Service Providers (ISPs) (not shown). The client computers 20(a), 20(b) typically have less memory and less computing power than the server computer 17.

The server computer 17 may have access to one or more databases of information. As shown in FIG. 1, the server computer 17 may have access to a user profile database 14, a user performance log database 13, and an electronic content database 15. Although the databases are shown as being distinct entities, they may be combined in some instances. For instance, a user's profile and the user's performance log may be cataloged under the user's name or other user identifier in a single database. The user profile database 14 may include the user's personal preferences and information about the user. Exemplary user profile information may include information such the user's age, hobbies, address, phone number, e-mail address, school, favorite subjects, relatives, teachers, favorite songs, favorite sports; favorite foods, favorite cartoons, etc.

Information in the performance log database 13 and the user profile database 14 can be used to select problems which the user can more easily identify with and will more likely attempt. For example, if a user has expressed an interest in baseball, then math problems and word problems relating to baseball can be selected and included in the content package. Since the selected problems pertain to subject matter that the user can easily identify with and address the user's deficiencies, they will keep the interest of the user while helping the user overcome any deficiencies.

The user performance log database 13 may include a record of the user's past interactions with the interactive learning appliance 21. For example, the database can contain a user's performance log, which documents the user's interaction with the interactive learning appliance 21 over a lengthy period of time. It may contain a more comprehensive record of the user's interaction history than the user log file on the interactive learning appliance. The user log file on the interactive learning appliance may primarily document the user's interaction history between successive log file uploads to the server computer. The user log on the database 13 may contain a record of all problems that the user has attempted with the interactive learning appliance. Problems may be marked "tried", "new" or "used" in the user's performance log in the database 13. Information in the user's performance log can be used to select appropriate problems, facts, etc. for a content package for the user. For instance, when the server computer 17 analyzes the user log, the number of problems marked "used" may be reduced in the created content package or may not be included in the content package. The user performance log database 13 may also contain reports relating to the user's performance. For example, graphs illustrating the user's performance over time can be present in the user performance log database 13.

The electronic content database 15 may include any suitable content which can be included in the content package. The content may be in the form of static information, dynamic information, sound files, video files, applications, etc. The content may include problems (e.g., questions, puzzles, riddles, quizzes), as well as songs, games, hints, music, facts, greetings, and messages (e.g., help, encouragement, or error messages).

The system, and especially the server computer 17, can include one or more computer programs, written in any suitable computer language. For example, first, second, and third computer programs used for performing three different functions can be embodied in a single computer program having one or more subroutines, or may be embodied by three separate and distinct computer programs. In embodiments of the invention, for instance, the server computer 17 may have one or more computer programs to: update a user profile in a user profile database, update a user's performance log in a performance log database, retrieve data from any suitable database, and send data to any person. One or more computer programs may also be provided to analyze a log file obtained from a user, select content for and assemble a content package for the user, and send the content package to the user.

The server computer 17 and the client computers 20(*a*), 20(*b*) communicate through a communication medium such as the Internet, and more particularly the World Wide Web (WWW). Typical communication protocols include HTTP (hypertext transfer protocol) and TCP/IP (terminal communication protocol/internet protocol). Some sites may include a client computer 20(*b*) without a corresponding interactive appliance. 21. For example, a teacher, a parent, or other individual may contact the Web site 16 to view a report relating to a user's performance, or may upload content such as problems, questions, or facts to the Web site 16 so that the content can be included in a content package for the user.

By working together, the server computer 17 and the interactive learning appliance 21 can provide a greater variety of content to the user than would otherwise be the case. For instance, in embodiments of the invention, over 25,000 spelling words can be present on the electronic content database 15 and can be available for use in content packages. Such vast access to spelling words is not available on conventional interactive learning devices. Moreover, the content in the content database 15 can be easily updated or supplemented by a host entity. Information can be updated and subjects such as current events can be readily tested. This is not available with typical conventional interactive learning devices, because access to additional information is limited.

Figure 2:
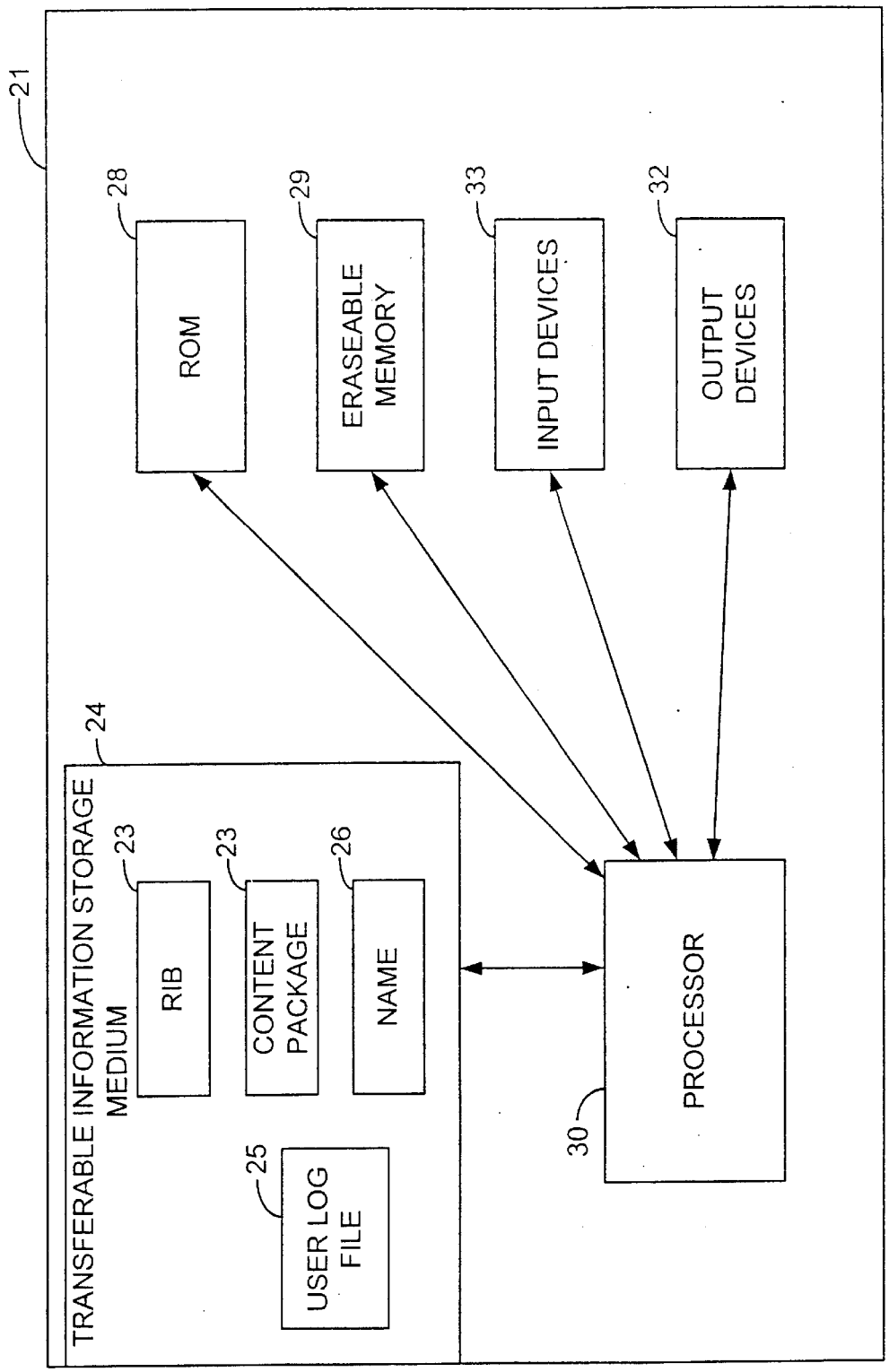
FIG. 2 shows a block diagram of an interactive learning appliance according to an embodiment of the invention.

FIG. 2 shows a block diagram showing some components of an interactive learning appliance 21. The interactive learning appliance 21 may be in any suitable form. For example, the interactive learning appliance 21 may be cylindrically-shaped or shaped as a platform. The cylindrically-shaped interactive learning appliances preferably have at least one ring which rotates around a cylindrical body. The ring can be used to select problems, subject areas, and answers and may act as a rotating switch. In some embodiments, the interactive learning appliance can be in the form of a child's representation of an adult object. For instance, in some embodiments, the interactive learning appliance can be in the form of a child's laptop computer or a child's compact disk player (e.g., a "boom-box"). Children's representations of adult objects typically have brighter colors and/or larger buttons than corresponding adult objects. An interactive learning appliance 21 for the child may also have pictures or three-dimensional figurines of animated or moveable characters. The interactive learning appliance 21 can also be portable or hand-held. The interactive learning appliance 21 may be considered an educational toy in some embodiments.

The interactive learning appliance 21 may comprise a housing (not shown) which may house a processor 30 such as a microprocessor, a read only memory (ROM), an erasable memory 29, one or more input devices 33 for the user to input information, and one or more output devices 32 for the user to receive information 32. Suitable input devices may include any suitable combination of buttons, switches, speech recognizers, alpha-numeric keypads or keyboards, selection devices such as styluses, and rotary switches such as rings which can be used to select certain information (e.g., numbers, letters). Suitable output devices include speakers, visual display screens (e.g., LCD screens), vibrational sensors, etc. The ROM 28, the erasable memory 29, the input devices 33, and the output device 32 may all be in operative communication with the processor 30. The ROM 28 may include content such as music, sounds, and phrases which can be used with any of the downloaded content packages. It may also include a number of questions which may make up the "base content" for the interactive learning appliance. This base content can be pre-loaded into the interactive learning appliance so that the user need not download any content before using a new interactive learning appliance. A speech synthesizer chip or music generator (not shown) may also be included in the interactive learning appliance. The speech synthesizer chip can provide a human voice to the interactive learning appliance to guide, help, or encourage the user in learning. Batteries or a power cord may supply power to the interactive learning appliance 21. Other specific features of various interactive learning appliance embodiments can be found in U.S. Provisional Patent Application No. 60/181,967 filed Feb. 10, 2000, which is herein incorporated by reference.

Although information can be entered into the interactive learning appliance 21 using traditional means such as a keyboard or a touchpad, information can be entered in other ways. For example, in some embodiments, the interactive learning appliance 21 can be a hand-held device. An exterior dimension of the hand-held interactive learning appliance 21 can be used to measure objects. The hand-held interactive learning appliance 21 can be manipulated to measure an object and measurement information can be automatically entered into the appliance 21. For example, the appliance 21 may be in the form of a cylinder with a length and a diameter. A user may measure the length of an object by rotating the appliance 21 in a length wise direction and the number of rotations can be automatically entered into the appliance 21 using an internal rotation sensor and recorded. When the number of recorded rotations is multiplied by the known length of the appliance 21, the length of the measured object can be determined. For instance, the user can be asked by the appliance 21 to measure the length of his leg. The user may take his appliance 21 and rotate the appliance 21 in a length wise direction in an end-over-end fashion over his leg. The length of the leg may be equal to three lengths of the appliance 21 and this information can be automatically entered into the appliance 21. Accordingly, in embodiments of the invention, the entire interactive learning appliance can be physically manipulated to obtain and automatically enter information into it. In addition to mentally interacting with the interactive learning application (e.g., by answering questions posed by the appliance), the user can physically interact with the interactive learning appliance 21. When a user such as a child is able to physically interact with an appliance, the child is more likely use the interactive learning appliance and remember any experience with the interactive learning appliance.

The interactive learning appliance 21 may also include a transferable information storage medium 24 which may contain a user log file 25, a RIB (Read-only memory Information Block) 23, a content package 23, and a name file 26. The RIB 23 can be a directory for the information storage medium 24. For example, the RIB 23 may contain information relating to the types of information stored and the location of the stored information on the transferable information storage medium 24. The RIB 23 (or other portion) may also include security information used when transferring data over the Internet. The content package 23 may include applications, information, problems (e.g., questions), games, etc. in static or dynamic form. Lastly, the name file 26 can include personal information about the user. For example, the name file 26 may include a personalized audio greeting for the user, an identifier for the interactive learning appliance being used, passwords, etc.

Preferably, the housing of the interactive learning appliance 21 is made of plastic and is cooperatively structured to receive the transferable information storage medium 24. For example, the housing may include a recess for a memory cartridge containing a user log file. The processor 30 can write data to the information storage medium 24 or read data therefrom. The processor 30 may also send information to the ROM 28 or the erasable memory 29.

Information such as questions, words, pictures, musical sounds, applications, etc. may be stored in libraries of code, libraries of resources,; and libraries of applications in the interactive learning appliance. Information such as this may be stored once in an interactive learning appliance (e.g., in a ROM), and may be accessed according to set of instructions provided to the processor. Sets of instructions for manipulating data, rather than the data files themselves, can be quickly transferred to an interactive learning appliance and stored in memory. Large data files such as sound and image files need not be repeatedly transferred to and from the interactive learning appliance. Rather, small instruction files may be transferred, thus resulting in faster data transfer and lower memory capacity requirements. Music data, for example, may be transferred to and from the interactive learning appliance according to a MIDI (Musical Instrument Digital Interface) or MIDI-like protocol.

In an illustrative embodiment, a model code sequence can invoke general audio sequences (GAS) and/or graphical command sequences (GCS) by making a single call. GAS and GCS sequences are described in detail below. The GAS and GCS sequences can even be synchronized. This can all be done without having the model code sequence worry about the details of interpreting or processing these command sequences. A kernel and operating system code in the interactive learning appliance handles that repetitive task. For example, if the model code sequence wants to play an introduction, it can go to a model view data file and obtain the names of the GAS and GCS it is to play. It then makes two system calls to play them. For example, the calls may be:

Play GAS (hGAS_HelloThere)
Play GCS (hGCS_IntroAnimation)

At that point, the model code can forget about the details of what this GAS/GCS combination is doing. It can wait for them to finish before moving on to the next task. The details of what is played as audio and what is displayed is completely controlled by the GAS and GCS data resources.

The model code sequences can be written to be reused. Each model code sequence can be written to perform specific types of actions, play a certain game, etc. Model code sequences may be stored in a view data file. The view data file may describe the actual GAS and/or GCS sequences to use. This allows the model code to be reused using different audio and graphics sequences.

A graphics command sequence (GCS) is a series of commands that makes calls to various graphic resources which present images to a display device. Graphic resources may include collections of small graphical images. Font images, for example, may be stored in a FONT resource. This could be a set of characters making up an alphabet or a sequence of graphical frames making up an animation.

The actual graphic image data need not be stored with the GCS. This allows a graphic image to be referenced many times using GCS commands, but only stored once. GCS commands can be used to specify a complex sequence of graphic drawing commands invoked by a single call in the model code. An example of a GCS for an introduction is as follows:

GCS commands for hGCS_IntroAnimation
DrawFont hFONT_IntroAnimation, Frame 1
wait 0.5 seconds
DrawFont hFONT_IntroAnimation, Frame 2
wait 0.5 seconds
DrawFont hFONT_IntroAnimation, Frame 3
wait 3.0 seconds
ClearDisplay
DrawFont hFONT_5x8Chars,Letters "Hello"

A general audio sequence (GAS) is a series of commands that call various audio resources which may be labeled CA, SYN and RAW audio resources. Although any suitable labels may be used, SYN may be a short form for the word "synthesized" and may be used in conjunction with an on-chip synthesizer used for musical instruments, horn honk, animal sounds, etc. "SYN" files may be derived from musical instrumental digital interface (MIDI) type files. "RAW" may be raw, or uncompressed, audio sound files. They can be used when sounds of very high quality are desired. "CA" may stand for "compressed audio" files.

Each CA audio resource is a compressed binary file representing a word, phrase, or sound. Each SYN audio resource may be a set of commands representing instruments and notes. In some embodiments, the actual instrument sound files are not stored with the SYN audio resource, just the commands. This allows musical sets of commands to specify complex musical pieces with a very high quality in very small space. The instrument sounds and notes are stored in a RAW audio resource file which may be an uncompressed binary file representing a sound. It may be used when an extremely high quality of audio output is desired. The GAS places calls to the various audio resources, and it is this binary information that is sent to the hardware.

In preferred embodiments, the actual audio data is not stored, just the instructions to play the audio data. This allows the same audio to be used multiple times with no additional audio storage required. GAS sequences are a very compact way to specify and play audio resources. A single GAS command sequence can specify a complicated sequence of audio. Exemplary GAS commands may include the following:

GAS commands for hGAS_HelloThere
Play hCA_Hello
Wait 0.1 seconds
Play hCA_There

In embodiments of the invention, zone adjustment can occur while the user is using the interactive learning appliance and/or after the user's log file is uploaded to the server computer. The interactive learning appliance 21 may also include appropriate software to identify a particular zone for the user as the user is using the device. Zone determination can occur using the processes described below with reference to FIGS. 4(a) to 4(d). As will be explained in further detail below, in these embodiments, the user answers a certain percentage (e.g., 50, 60, 70, or 80% or more) of questions right or wrong in a zone before their current zone is incremented or decremented. When the user's log file is uploaded to the server computer, a much more thorough zone analysis and determination can take place. The zone determination method used by the server computer can be characterized as a standard zone-determining method.

In addition to the standard zone-determining method, a "fast-track" version can be used in the system. A fast-track version can be used when the user has not been previously placed into a zone. To place the user into the correct zone as quickly as possible, the fast-track version tests the user on a smaller number of problems than in the standard zone-determining method. Typically, a user begins using the device without an assigned zone and the fast-track version is used to quickly determine the user's zone. If the user has not moved zones within a predetermined time or after attempting a predetermined number of problems, the interactive learning appliance can switch from a fast-track mode to a standard zone-determining mode. As long as the user keeps moving between different zones before he is asked a predetermined number of questions, the fast-track version remains operative. Once the user switches to a standard zone determining mode, it is assumed that the user is in approximately the correct zone.

Other techniques can be used to determine the user's zone. For example, in one embodiment, the current zone can be incremented or decremented when a predetermined number of problems are respectively answered correctly or incorrectly in a row. For example, at least 3 (e.g., 3, 4, or 5) correct or incorrect answers in a row may increment or decrement the user's zone, regardless of the percentage of correct or incorrect answers actually achieved in the zone. Successive incorrect or correct answers can indicate a trend in the user's performance, and can indicate that the current zone is not optimally suited for the user. The zone can be quickly adjusted upward or downward without requiring the user to finish all problems in the zone, thus saving the user from having to answer a large number of problems which the user is clearly capable or incapable of answering. For example, a zone may contain 100 problems and the standard zone determining method may require the user to answer 80 problems (e.g. 80%) correctly before moving up one zone. In a fast-track version, 10 correct answers in a row can quickly indicate that the questions are too easy for the user and the user can move up one zone without having to answer the remaining 70 problems before advancing to the next zone.

Figure 3:
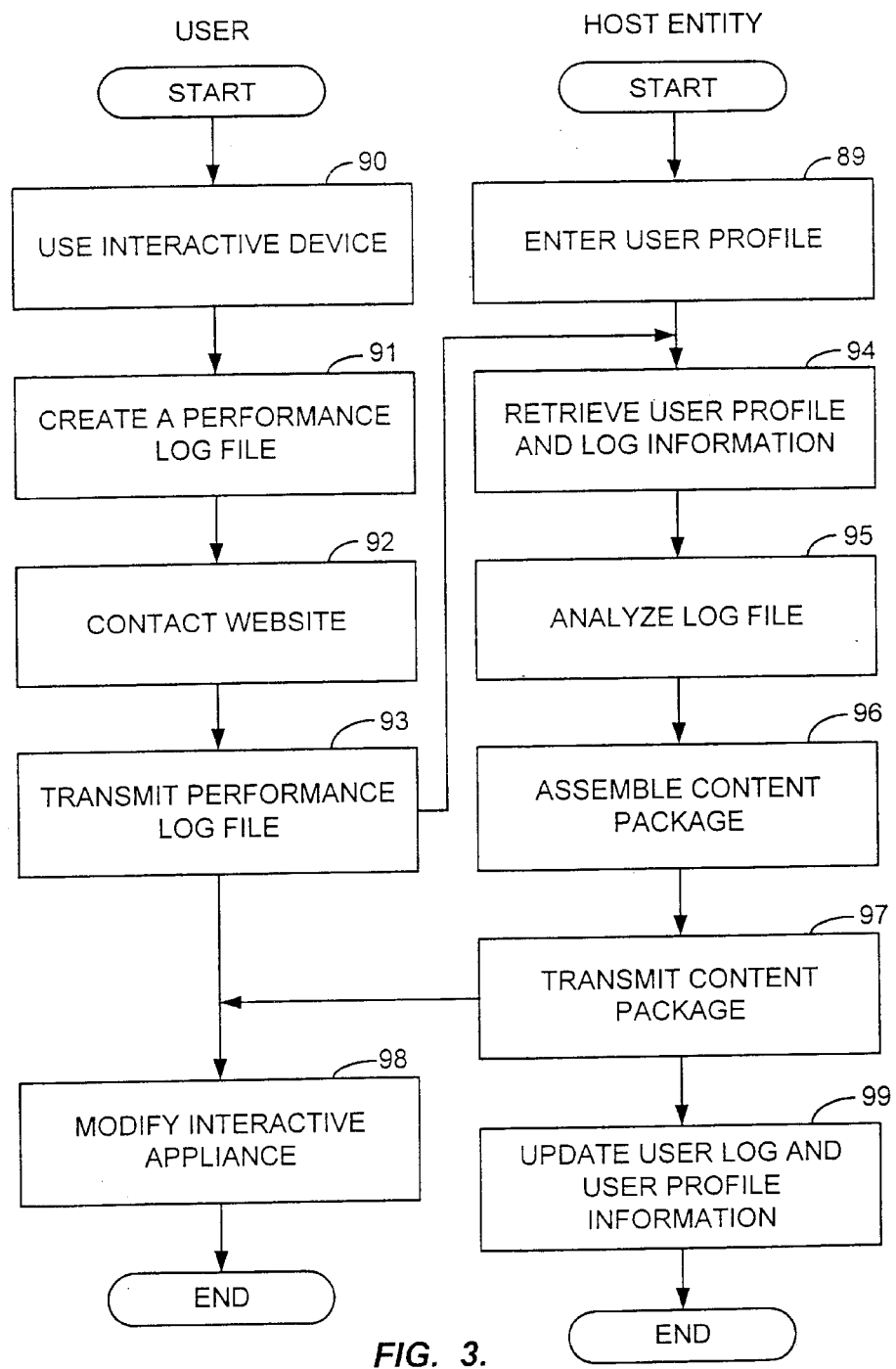
FIG. 3 shows a flowchart which illustrates the interaction between the user and a host entity in an embodiment of the invention.

Embodiments of the invention can be described with reference to FIGS. 1 and 3. First, a user at a user site 10 uses an interactive learning appliance 21 (step 90). As the user uses the interactive learning appliance 21, a user performance log file is updated or created in the interactive learning appliance 21 (step 91). After the user has used the interactive learning appliance 21, the user removes a transferable information storage medium (not shown) containing the user performance log file from the interactive learning appliance 21. The transferable information storage medium is then inserted into a linker device 19 which is coupled to a client computer 20(a). Using the client computer 20(a), the user contacts a host entity's Web site 16 (step 92). For example, the uniform resource locator (URL) for the Web site 16 can be entered manually or automatically into the client computer 20(a) and the pages of the Web site 16 may be returned to the user's client computer 20(a). Once contact is made, a Web page displays a personal greeting ("Hi Dan!") to the user and the user performance log file is transferred from the linker device 19 to the client computer 20(a). The log file is then uploaded from the client computer 20(a) to the server computer 17 operating the Web site 16 via a communication medium 18 such as the Internet (step 93). At some time, the user's profile may be entered into the user profile database 14 (step 89). User profile information can be uploaded to the server computer 17 and then transmitted to the user profile database 14, or the user profile information may be sent to the host entity (e.g., through regular mail) and may be entered into the user profile database 14 by the host entity.

Once the user performance log file is received by the server computer 17, the server computer 17 retrieves user profile information from a user profile database 14 and also retrieves information relating to the user's past performance from a user performance log database 13 (step 94). Using the retrieved information, a PALM module on the server computer 17 analyzes the log file (step 95). Using the analyzed information, the PALM module on the server computer 17 can retrieve electronic content such as problems, facts, and questions, from an electronic database 15. The particular content used to form the content package can be chosen in accordance with information in the user's profile (e.g., the user's preferences) and/or can be chosen in accordance with the user's past performance. For example, if past performance indicates that the user is not proficient in multiplication and the user's profile indicates that the user likes to do word problems, then a greater percentage of word problems teaching multiplication can be included in the content package.

A content package is then created by the server computer 17 after the log file is analyzed (step 96). Then, the created content package is then transmitted (e.g., downloaded) to the client computer 20(a) at the user's site 10 and is written to the transferable information storage medium disposed in the linker device 19 (step 97). After the content package is transferred to the information storage medium, the information storage medium is then removed from the linker device 19 and is inserted into the interactive learning appliance 21, and the content package modifies the interactive learning appliance (step 98).

After or before the download of the content package is complete, the user's performance log information and user profile information may be updated in the appropriate database 13, 14. For instance, problems which the user answered incorrectly can be marked "tried" in the user's performance log in the user performance log database. These problems can be included in a subsequently created content package to re-test the user on problems that he previously answered incorrectly.

If desired, reports of the user's performance and progress can be generated. These reports may be accessed by another person such as a teacher, parent, or grandparent using a client computer 20(b). The person can contact the host entity's Web site 16 and may view or download the user's report. In some embodiments, reports can be automatically sent to the user or other persons. For instance, the server computer 17 can automatically e-mail a report to the user's parents or teachers after the user log file is uploaded and analyzed. The user or other persons may also upload content such as problems, applications, comments, or messages to the server computer 17 for storage in the electronic content database 16. This content can be included in a subsequently created content package for the user.

Participation by parents and teachers in the learning process can help to ensure that the child receives appropriate reinforcement or guidance from others. Parents and teachers, for example, can supplement the child's learning process by providing the child with additional or different educational material to supplement what the child has learned using the learning appliance. For example, after viewing a child's report on a Web site, a teacher can identify areas where the child may have particular difficulty. The teacher can then use any suitable non-electronic forms (e.g., lectures, flashcards, textbooks, etc.) of teaching to assist the child in learning about a given subject. In another example, in a classroom situation, a student may perform homework on a cartridge-containing interactive learning appliance at home. Answers to the homework can be recorded on the cartridge. Then, the student may bring the cartridge containing the logged answers to class each morning. Using appropriate computer equipment, the teacher could obtain print-outs of the student's answers or view the student's answers on a display screen. Depending on the student's results, the teacher could select a particular lesson that had been previously uploaded by the teacher or other person, or could allow the student to continue using the adaptive interactive learning appliance. Advantageously, embodiments of the invention can analyze the user's performance and can provide prescriptive content to the user to address any difficulties that he may be having, while allowing persons such as parents and teachers to participate in the process.

The content package can include a mixture of problems. The mixture of problems may contain problems selected from different zones. Preferably, at least 50% of the problems in the content package are selected at the user's current zone, and less than 50% of the problems are selected from zones higher and/or lower than the user's current zone. For example, problems can be selected from the user's current zone, one or more zones with more difficult problems than the current (e.g., a higher zone) and/or, one or more zones with less difficult problems than the current zone (e.g. a lower zone). The content package received by the user can include a mixture of problems which can serve to challenge the user at a higher level (e.g., the more difficult problems), challenge the user at his current intellectual level, and encourage the user by providing the user with a certain number of easier problems (e.g., from a lower zone). Accordingly, the problems in the content package can be centered around the user's present intellectual level, while providing a sufficient number of problems to challenge and encourage the user to continue using the interactive learning appliance.

When visiting the host entity's Web site 16, the user or other person may select specific problems for the content package, or may request that only-certain types of problems be included in the content package. Selectable problems may be provided by the host entity or may have been uploaded by a person. These problems can be displayed on the host entity's Web site for selection by the user or another person. For example, when visiting the host entity's Web site, the user can request that only problems pertaining to "sports history" be included in the content package by selecting a "sports history" button on the Web site. The server computer may then only select problems which pertain to sports history. In another example, the user may individually select individual sports history problems on the Web site for inclusion in the content package.

Problems can be selected from any suitable zone (e.g., the user's current zone) using information obtained in an analysis of the user's errors. For example, after analyzing the user's log file, a program in the server computer can determine what common types of errors the user is making, and can thus identify the user's deficiencies. The user's deficiencies can be addressed by selecting a number of problems directed to the errors that the user is making and these problems can be included in the content package. Consequently, the content package which is sent to the user can include a prescriptive component which will specifically address the user's deficiencies.

Figure 4A:
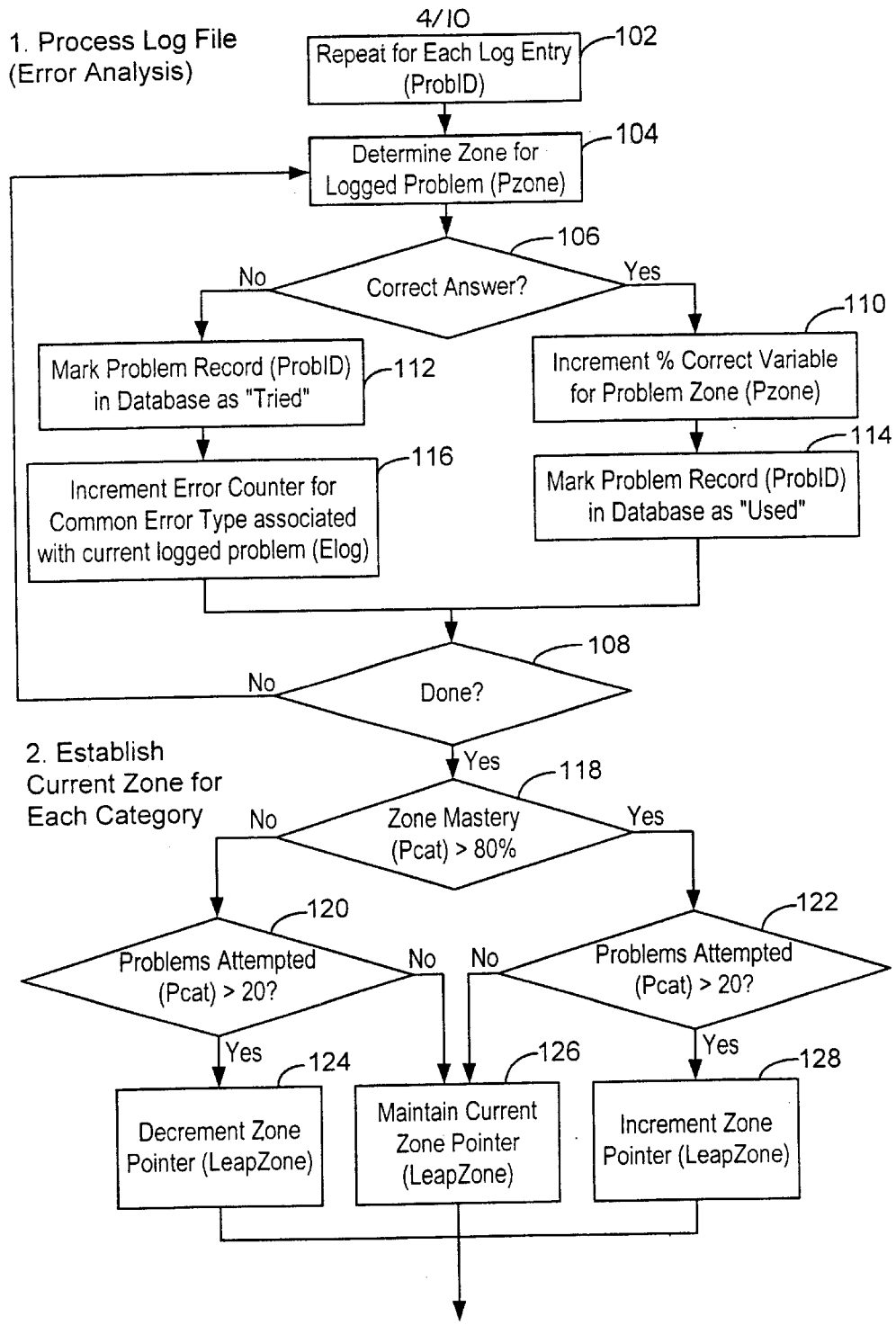
FIGS. 4(a) to 4(c) show flowcharts which illustrate an exemplary process for analyzing a user log file and creating a content package.

Embodiments which show how a content package including a mixture of problems can be described with reference to FIGS. 4(a) to 4(c). In this embodiment, a user log file is analyzed and a content package is created for a user. With reference to FIG. 4(a), a log file can be processed by a server computer and an error analysis can be conducted. A log entry having an associated problem ID and a response from the user can be read(step 102). Once the problem ID is determined, the corresponding zone for that problem is determined (step 104).

A determination is then made as to whether the response provided by the user is correct (step 106). If the answer to the particular problem is correct, then a percent correct variable for the problem zone 110 is incremented (step 110). The problem record is marked in the user's problem record as "used" (step 114). If the answer to the particular problem is incorrect, then the percent correct variable for the problem zone is not incremented. The problem record for the user is marked as "tried" for that problem (step 112), and an error counter for common error types associated with the particular problem is incremented (step 116). A determination is then made as to whether the error analysis is completed (step 108). If more problems are to be analyzed, the error analysis process can be repeated for these problems.

After a determination is made as to whether a problem or group of problems has been correctly or incorrectly answered by the user, a determination is made as to whether the user has mastered the current zone (e.g., $P_{cat}$). In this particular example, a determination is made as to whether the user has answered at least 80% of the problems for the zone correctly (step 118). If the user has answered at least 80% of the questions correctly, a determination is made as to whether the number of problems attempted in the particular category (i.e., skill) is greater than 20 (step 122). If the user has attempted more than 20 problems, then the user is attempted a sufficient number of problems and the zone for the user is incremented (step 128). If the user has not attempted more than 20 problems, then the current zone is maintained for the user. If the user has answered less than 80% of the questions correctly, then a determination is made as to whether more than 20 problems have been attempted. If more than 20 problems have been attempted, then the zone is decremented (step 124). If 20 problems or less have been attempted, then the current zone is maintained for the user (step 126).

In some embodiments, the criteria used to determine whether a user advances in a zone or not may change for each content package sent to the user. For instance, if particular problems are to be selected from a particular zone and the zone has a small number of problems, then the number of problems that the user has to answer correctly before advancing out of the zone may be less than if there were a larger number of problems available in the zone. This might be done so that the small number of problems within the zone are not repeatedly presented to the user and the user is presented with new problems.

Figure 4B:
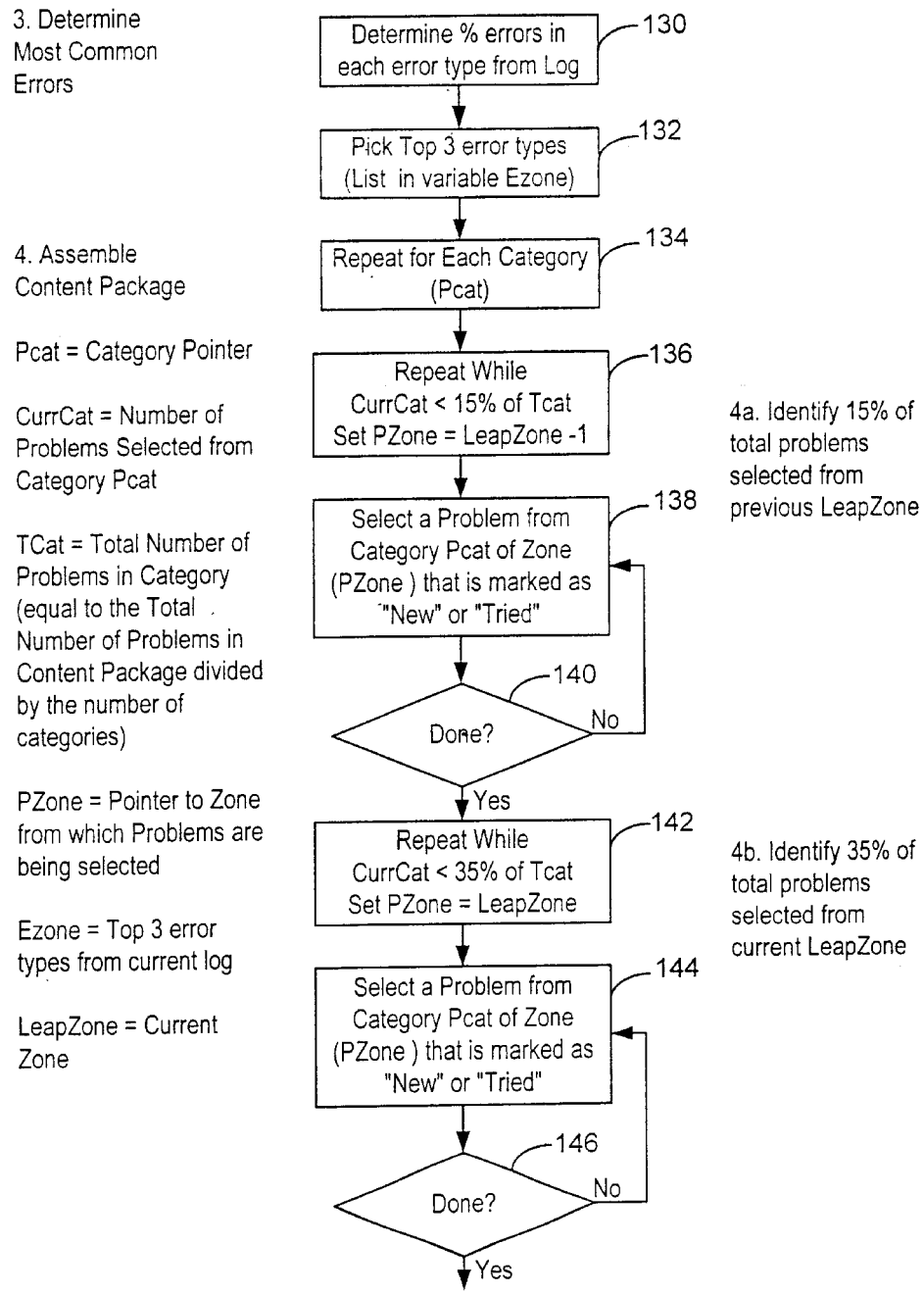
Figures 4C, 4D:
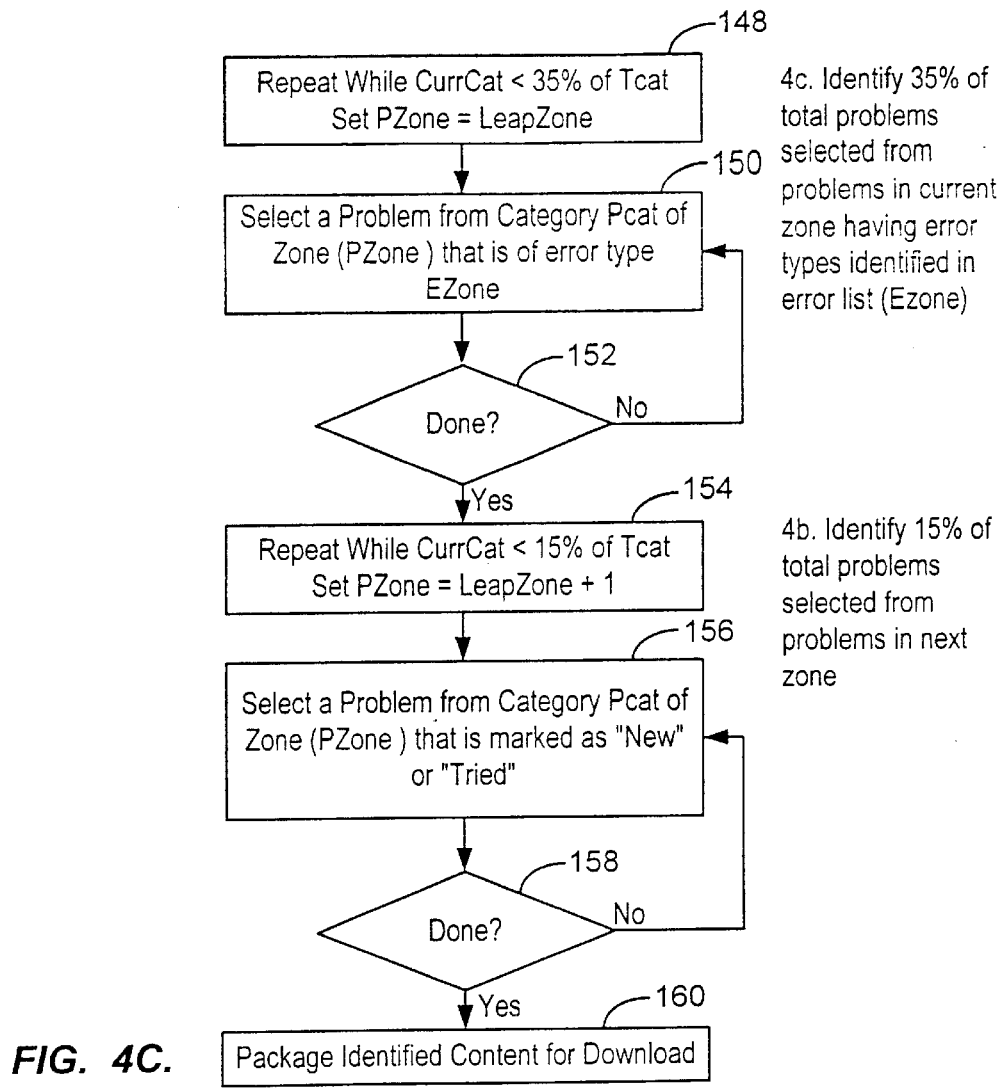
FIG. 4(d) shows a block diagram of the components of a content package created according to the process shown in FIGS. 4(a) to 4(c).

With reference to FIG. 4(b), once the zone is established for the user, a determination of the percentage of errors in each error type can be made (step 130). The top three error types are then determined (step 132). This process is repeated for each category (i.e., skill) (step 134). This information can then be used to assemble a content package particular to the user.

After error analysis, a content package is created for the user. In this example, 15% of the problems are selected from a lower zone with less difficult problems than the current zone distributed across all categories, 15% of the problems are selected from a higher zone with more difficult problems distributed across all categories, 35% of the problems are selected from the current zone with the most frequent common errors equally distributed across all categories in the zone, and 35% of the problems are selected from the current zone. These problems may be equally distributed across all problem categories in the zone and may optionally be selected using the identified common errors.

With reference to FIG. 4(b), a zone pointer is set to a lower zone than the current zone and 15% of the total problems for the content package are selected from this lower zone (step 136). For each category, a problem is selected from those problems marked "new" or "tried" (step 138). This process is repeated until the target of 15% is reached (step 140).

Then, the zone pointer is set to the current zone so that 35% of the total problems for the content package are selected (step 142), e.g., without using the previously determined error information. "New" or "tried" problems are selected from the current zone categories until 35% of the total problems for the content package are selected (steps 144, 146).

After problems are selected from the current zone, additional problems from the current zone can be selected using the previously determined error information. In this example, 35% of the total problems in the content package will include these problems and the zone pointer is maintained at the current zone (step 148). Problems are selected from categories according to the identified error types (step 150) and this process is repeated until the number of problems equals about 35% of the total number of problems in the content package (step 152).

Last, the zone pointer is incremented to the next higher zone and problems equal to about 15% of the total number of problems in the content package are selected (step 154). "New" or "tried" problems are selected from the different categories within the zone and this process is repeated until the desired number of problems are selected (steps 156, 158). Once the content package is assembled, the content package is downloaded to the user (step 160).

Of course, any suitable variation of the processes described with reference to FIGS. 4(a) to 4(d) are encompassed in embodiments of the invention. For example, in some embodiments, steps to determine the most common errors (i.e., steps 130–132) need not be included in the creation of the content package. For example, the interactive learning appliance may be adapted to provide the user with a number of "fun facts" at varying levels of skill. A mixture of problems from different zones would be desirable so that the selected problems are not too hard or too easy for the user. A prescriptive component may or may not be included in these embodiments.

Figure 5A:
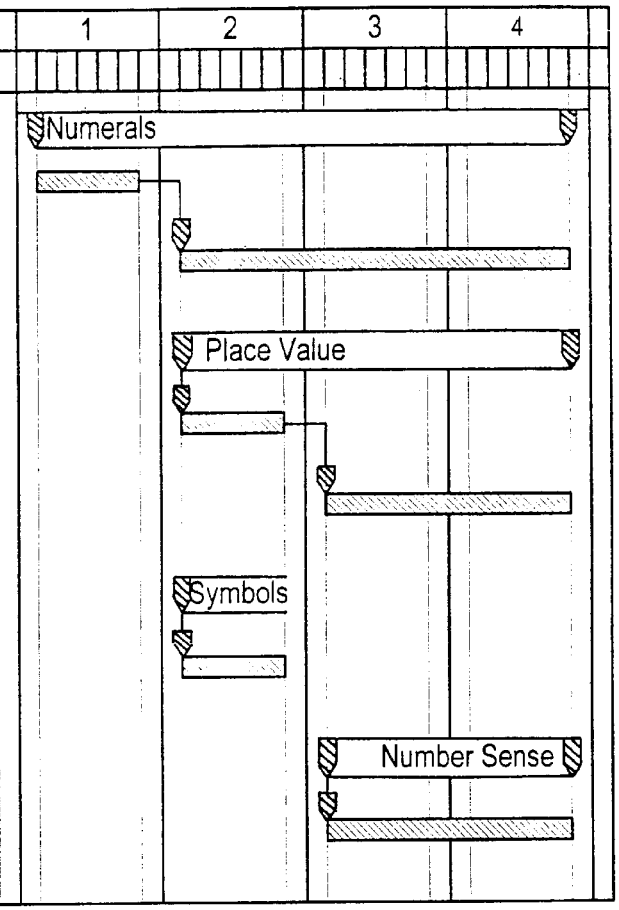

FIGS. 5(a) and 5(b) show a matrix for a math-based interactive learning appliance. Other matrices are disclosed in U.S. Provisional Patent Application No. 60/181,967 filed Feb. 10, 2000, which is herein incorporated by reference in its entirety for all, purposes. The matrix shown in FIG. 5(a) lists topics such as "Numerals", "Place value", "Symbols", "Number sense", "Addition", "Subtraction", "Problem Solving", "Money", and "Time". Each topic can include various skills associated with it. For example, the topic "Number sense" has the skill "Identify missing number" associated with it. Each topic and skill can have a identification numbers (IDs) associated with them so that errors for these topics and skills can be tracked, tabulated, and/or analyzed for the above-described error analysis process. For example, with reference to FIG. 5(a), a topic may be "Numerals" and a specific skill under this topic can be "Identify 1 to 12" (i.e. identify numbers from 1 to 12). These items can have ID numbers "2" and "3" respectively. As shown in FIG. 5(a), the problems associated with the skill "Identify 1 to 12" may only be present in zone 1, while problems associated with the skill "Identify 1 to 100" can be present in zones 2 and 3. Once the user has correctly answered a predetermined number "identify numbers from 1 to 12" problems correctly, the user is elevated from zone 1 to zone 2. Problems can then be selected from zone 2 when creating a content package. For example, a number of problems from the skills "Identify 1 to 100". "Identify 10's and 1's place", and "Recognize+−=" can be selected and put into the user's content package.

FIGS. 6(a) and 6(b) show examples of problems which might be assigned to different levels. Other examples are provided in U.S. Provisional Patent Application No. 60/181, 967. The different levels may correspond to different grades. For example, level 1 may correspond to the first grade, while level 2 may correspond to the second grade. As shown in FIG. 6(a), the failure of a user to answer the problem "4,_, 6, 7" correctly may indicate a "counting error". If the user answers too many problems of this type wrong, this may indicate that the user is not proficient in counting. Using this information, problems and or help messages associated with teaching counting skills can be provided to the user in the content package to help overcome this deficiency.

Although many of the above-described embodiments relate to helping a user become educated about one or more specific subjects, embodiments of the invention can be used to assist a user in any suitable learning situation. Many types of games, for instance, only remain interesting if they increase in difficulty. Otherwise, once a user masters the principles specific to the game (for example in strategy games) or learns a limited set of facts through repetitive exposure (for example in a game like Trivial Pursuit™), the user can become bored. Embodiments such as the interactive learning appliance can be used to gradually in crease the complexity level and degree of challenge presented in many types of games (including puzzle games similar to Myst™ or dexterity games like the GameBoy™ games). Similarly, the challenge level can be decreased if the user becomes overly frustrated. In preferred embodiments, content packages including content in zones which relate to various skill levels for various aspects of games may be downloaded to the user's interactive learning appliance. There are many things to learn in life other than academic subjects. The user can learn new paradigms by being exposed to various non-academic challenges in the form one or more games. The user can learn the new paradigms as the user's skill increases when playing the games.

The interactive learning appliance and other embodiments can be used to teach music in addition to traditional academic subjects such as reading and arithmetic. The capability of the interactive learning appliance to produce many different types of high quality sound is particularly useful in providing music instruction. At a basic level, notes and their octaves can be produced, sequentially, then in unison. Next the octave can be broken into an arpeggio, an eight-note, or a five-note scale. Major, minor, blue, and other scales can be taught. Harmony can be taught by playing an arpeggio in unison with the sounding of the tonic. The arpeggio can be displaced an octave so it sounds above or below the tonic. Multiple lines, voiced in instruments or vocal lines can be added to teach increasingly complex notions of harmony. Fundamental harmony can be taught by downloading the harmonic lines of songs in different channels. When the song is played on the interactive learning appliance, each line can be switched on or off. Consider for example, that the user downloads a performance of "The Saints Go Marching In". The melody line is played on a horn, a high harmonic line is played on a flute, a rhythm line is played on drums, a middle line is played on guitar, and a continuous line is played on keyboard. The user can toggle a switch associated with each instrument to cause that instrument's line to sound or not. By singing along with each line, the user can learn how to create harmony and counterpoint. Depending on the zone of the user, more or less complex pieces can be provided in the content package. Additionally, the concept of tempering scales and non-western scales can be taught. Rhythm may also taught using embodiments of the invention. A basic notion of fundamental beat can divided into two, three, or four. More complex rhythm consisting of one instrument playing in four while another plays in three, or hemiola rhythms represent more complex, or higher level zones. As a user masters a form of harmony or rhythm the user can implement the new knowledge by manipulating the harmony or rhythm lines in specially available song elements. Internal lines can be made louder so they come out more, or displaced by a third or an octave in pitch. Songs can be rendered in different scales (e.g. minor, blue, pentatonic, etc.). The interactive learning appliance can be used as a music teaching device, that can use adaptive learning to teach harmony, rhythm, and other musical principles according to the skill of the User.

EXAMPLE

Timmy age 7, has been playing with his math interactive learning appliance and has made it to zone 4. He gets a message telling him to go to a host entity's Web site. Once Timmy arrives at the Web site and logs in, his log file is uploaded to the Web site and in a matter of seconds his log file is analyzed at the Web site and Timmy is told that he is performing well and is given congratulatory feedback. Based on Timmy's performance (80% of attempted questions correct), a new content package for his interactive learning appliance will be downloaded to Timmy's computer. In the new content package, 70% of the questions will come from level 5, 15% of the questions will come from level 4, and 15% of the questions will come from level 6. The content package can be transferred from Timmy's computer to his interactive learning appliance using a cartridge. The content package modifies the interactive learning appliance. Using the modified appliance and the new content package, Timmy can continue to have exciting and challenging math experiences.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention

We claim:

1. A method of using an a portable interactive learning appliance, the method including:
    a) answering problems selected by the portable interactive learning appliance, after the interactive learning appliance has determined a first current zone for the user from among multiple zones containing problems having respectively different levels of difficulty, wherein the problems selected by the interactive learning appliance are selected from at least the first current zone for the user;
    b) sending user performance information generated by the interactive learning appliance after a) to a server computer, wherein the server computer analyzes the user performance information, determines a second current zone for the user, and creates a content package for use in the interactive learning appliance using the analyzed user performance information, wherein the content package includes problems selected from at least the second current zone for the user;
    c) receiving the content package;
    d) loading the content package into the interactive learning appliance to create a modified interactive learning appliance; and
    e) using the modified interactive learning appliance,
    wherein the interactive learning appliance is cylindrically shaped and has a body, and wherein the input device is a ring that is disposed around the body.

2. The method of claim 1 wherein c) comprises receiving the content package at a client computer, and wherein the method further comprises:
    transferring the content package from the client computer to a linker device and then to a transferable information storage medium before d).

3. The method of claim 1 wherein d) includes inserting a transferable information storage medium into a recess in the body of the interactive learning appliance.

4. The method of claim 1 wherein the interactive learning appliance is an educational toy.

5. The method of claim 1 wherein the memory or the information storage medium comprises code for spelling problems.

6. The method of claim 1 wherein the memory or the information storage medium comprises code for math problems.

7. The method of claim 1 wherein the method further comprises inserting a transferable information storage medium containing the content package into a recess in the body.

8. The method of claim 1 wherein the interactive learning appliance comprises a speaker and a display device.

9. The method of claim 1 wherein c) comprises receiving the content package at a client computer at a user site, and wherein the method further comprises:
- transferring the content package from the client computer to a linker device at the user site and then to a transferable information storage medium before d),
- removing the transferable information storage medium from the linker device at the user site; and then
- inserting the transferable information storage medium into a recess in the body of the interactive learning appliance.

10. The method of claim 9 wherein the transferable information storage medium comprises a user log file, general audio sequences, and graphical command sequences.

11. The method of claim 9 further comprising contacting a Web site on the server computer using the client computer.

12. The method of claim 9 further comprising, before a):
using the interactive learning appliance, wherein the interactive learning appliance uses a fast-track zone determining process to determine the user's zone.

13. The method of claim 9 further comprising, before a):
using the interactive learning appliance, wherein the interactive learning appliance uses a fast-track zone determining process to initially determine a zone of a user, and then a standard fast-track zone determining process to determine the zone of the user.

14. An interactive learning appliance for assisting a user in leaning, the interactive learning appliance comprising:
a) a processor;
b) an input device operatively coupled to the processor;
c) an output device operatively coupled to the processor;
d) a memory operatively coupled to the processor, the memory comprising (i) reusable data, (ii) computer code for analyzing a current zone of the user, (iii) computer code for causing the interactive learning appliance to select problems from at least the current zone of the user, and (iv) computer code for presenting the selected problems to the user via the output device; and
e) an information storage medium comprising a user log file, wherein the user log file stores information relating to the user's use of the interactive leaning appliance, and an instruction file including instructions for manipulating the reusable data in the memory so that the output device provides different outputs for the user using the same reusable data,
wherein the interactive learning appliance is portable and comprises a cylindrically shaped housing, and wherein the input device comprises a rotary dial.

15. The interactive learning appliance of claim 14 wherein the information storage medium is a transferable information storage medium.

16. The interactive learning appliance of claim 14 wherein the reusable data comprises reusable audio data.

17. The interactive learning appliance of claim 14 wherein the interactive learning appliance is an educational toy.

18. The interactive learning appliance of claim 14 wherein the memory or the information storage medium comprises code for spelling problems.

19. The interactive learning appliance of claim 14 wherein the memory or the information storage medium comprises code for math problems.

20. The interactive learning appliance of claim 14 wherein the output device is a speaker, and wherein the interactive learning appliance further comprises a display device.

21. The interactive learning appliance of claim 14 wherein the information storage medium is a transferable information storage medium, and wherein the information storage medium is in the form of a cartridge that is insertable in the cylindrically shaped housing.

22. The interactive learning appliance of claim 14 wherein the memory or the transferable information storage medium comprises code for science problems.

23. The interactive learning appliance of claim 14 wherein the memory or the transferable information storage medium comprises code for geography problems.

24. The interactive learning appliance of claim 14 wherein the interactive learning appliance is an educational toy.

25. The interactive learning appliance of claim 14 wherein the memory or the transferable information storage medium comprises code for history problems.

26. A system comprising:
an interactive learning appliance for assisting a user in learning, the interactive learning appliance comprising:
a) a processor; b) an input device operatively coupled to the processor; c) an output device operatively coupled to the processor; d) a memory operatively coupled to the processor, the memory comprising (i) reusable data, (ii) computer code for analyzing a current zone of the user, (iii) computer code for causing the interactive learning appliance to select problems from at least the current zone of the user, and (iv) computer code for presenting the selected problems to the user via the output device; and e) an information storage medium comprising a user log file, wherein the user log file stores information relating to the user's use of the interactive learning appliance, and an instruction file including instructions for manipulating the reusable data in the memory so that the output device provides different outputs for the user using the same reusable data,
wherein the interactive learning appliance is portable and comprises a cylindrically shaped housing, and wherein the input device comprises a rotary dial; and
a linker device, wherein the linker device is adapted to receive the information storage medium.

27. A method comprising:
a) answering problems automatically selected by a portable interactive learning appliance comprising a processor, an input device coupled to the processor, and a speaker coupled to the processor, after the interactive learning appliance has automatically determined a first current zone for the user from among multiple zones of problems having different levels of difficulty, wherein the problems selected by the interactive learning appliance are selected from at least the first current zone for the user and wherein the interactive learning appliance creates a user log file comprising user performance information after the user has answered the problems automatically selected by the interactive learning appliance;

b) after performing a), contacting a server computer at a host site operated by a host entity using a client computer at a user site via a communication medium, wherein the communication medium comprises the Internet;

c) after performing b), uploading the user log file to the server computer operated by the host entity, wherein the server computer operated by the host entity automatically analyzes the user performance information, automatically determines a second current zone for the user based on the analyzed user performance information, and automatically creates a content package for use in the interactive learning appliance using the analyzed user performance information, wherein the content package includes problems selected from at least the second current zone;

d) after performing c), downloading the content package from the server computer operated by the host entity to the client computer at the user site via the communication medium;

e) after performing d), loading the content package into a transferable information storage medium via a linker device coupled to the client computer, wherein the transferable information storage medium is received in the linker device;

f) after performing e), inserting the transferable information storage medium into a recess in the interactive learning appliance to thereafter create a modified interactive learning appliance;

g) after performing f) using the modified interactive learning appliance, wherein the modified interactive learning appliance is not in communication with the server computer when the modified interactive learning appliance uses the content package that was previously downloaded; and h) after performing g), answering problems automatically selected by the modified interactive learning appliance, wherein the problems that are automatically selected by the interactive learning appliance are from the content package that was previously downloaded from the server computer at the host entity site.

28. A method comprising:

a) answering problems selected by a portable interactive learning appliance, after the interactive learning appliance has determined a first current zone for the user from among multiple zones containing problems having respectively different levels of difficulty, wherein the problems selected by the interactive learning appliance are selected from at least the first current zone for the user;

b) sending user performance information generated by the interactive learning appliance after a) to a server computer via a communication medium, wherein the server computer analyzes the user performance information, determines a second current zone for the user, and creates a content package for use in the interactive learning appliance using the analyzed user performance information, wherein the content package includes problems selected from at least the second current zone for the user;

c) receiving the content package from the server computer via the communication medium;

d) loading the content package into the interactive learning appliance to create a modified interactive learning appliance; and e) using the modified interactive learning appliance.

29. The method of claim 28 wherein the content package comprises problems from the second current zone for the user, a zone above the second current zone for the user, and a zone below the second current zone for the user.

30. The method of claim 28 wherein c) comprises receiving the content package at a client computer, and then transferring the content package to a transferable information storage medium via a linker device, and then inserting the transferable information storage medium into a recess in the interactive learning appliance.

31. The method of claim 28 wherein the problem selected by the portable interactive learning appliance include spelling problem.

* * * * *

UNITED STATES PATENT AND TRADEMARK OFFICE
CERTIFICATE OF CORRECTION

PATENT NO. : 6,801,751 B1
DATED : October 5, 2004
INVENTOR(S) : Wood et al.

It is certified that error appears in the above-identified patent and that said Letters Patent is hereby corrected as shown below:

<u>Title page,</u>
Item [*] Notice, insert -- Subject to any disclaimer, the term of this patent is extended or adjusted under 35 U.S.C. 154(b) by 276 days. --

Signed and Sealed this

Nineteenth Day of July, 2005

JON W. DUDAS
*Director of the United States Patent and Trademark Office*